United States Patent
Chae et al.

(10) Patent No.: US 6,587,190 B2
(45) Date of Patent: Jul. 1, 2003

(54) SYSTEM AND METHOD FOR MEASURING CHROMATIC DISPERSION IN OPTICAL FIBER

(75) Inventors: Jung Hye Chae, Kwangju (KR); Yong Tak Lee, Kwangju (KR)

(73) Assignee: Kwangju Institute of Science & Technology, Kwangju (KR)

( * ) Notice: Subject to any disclaimer, the term of this patent is extended or adjusted under 35 U.S.C. 154(b) by 126 days.

(21) Appl. No.: 09/775,660

(22) Filed: Feb. 5, 2001

(65) Prior Publication Data

US 2002/0051129 A1 May 2, 2002

(30) Foreign Application Priority Data

Sep. 21, 2000 (KR) .......................... 2000-55420

(51) Int. Cl.$^7$ ............................................. G01N 21/00
(52) U.S. Cl. ..................................................... 356/73.1
(58) Field of Search ........................ 356/73.1, 72, 477, 356/365, 450, 484, 634, 481; 250/227.18, 227.23, 227.14, 227.27; 359/109–110, 124–125, 161, 158, 189, 135, 188; 219/121.62, 121.68, 121.69; 385/12, 14

(56) References Cited

U.S. PATENT DOCUMENTS 5,323,224 A * 6/1994 Wada .......................... 356/73.1
6,281,471 B1 * 8/2001 Smart ..................... 219/121.62

* cited by examiner

*Primary Examiner*—Tu T. Nguyen
(74) *Attorney, Agent, or Firm*—Bacon & Thomas, PLLC

(57) ABSTRACT

A system for measuring chromatic dispersion in an optical fiber includes a multimode laser diode adapted to generate an optical pulse through gain switching; a highly dispersive optical fiber adapted to allow the optical output pulse to pass therethrough, and then adapted to separate each mode of the multimode laser diode to generate a reference signal; a test optical fiber adapted to allow an optical pulse for each wavelength separated by the highly dispersive optical fiber to pass therethrough to vary a repetition rate of the optical pulse train due to a chromatic dispersion characteristic of the test optical fiber using the optical pulse as the reference signal; and a high speed photodetector and RF spectrum analyzer adapted to detect eh variation of the repetition rate of the optical pulse train due to the chromatic dispersion characteristic of the test optical fiber.

4 Claims, 4 Drawing Sheets

SYSTEM AND METHOD FOR MEASURING CHROMATIC DISPERSION IN OPTICAL FIBER

BACKGROUND OF THE INVENTION

1. Field of the Invention

The present invention relates to a system and method for measuring a chromatic dispersion in an optical fiber, and more particularly, a technology which enables an implementation of a system for an accurate measurement of a chromatic dispersion in both a long-distance optical fiber and a short-distance optical fiber such as an optical fiber device through a proposal of a measurement method for a chromatic dispersion in an optical fiber which is insensitive to an external environmental condition.

2. Description of the Related Art

The chromatic dispersion representing a wavelength dependency of a wave group velocity due to the property of matter and the structure of an optical waveguide is a characteristic of an optical fiber causing a temporal spreading of an optical pulse which allows transmission of data, and a controlled chromatic dispersion is one of main technologies in implementation of a very high-speed and high-capacity optical communication system.

Accordingly, there have been researched various methods for controlling and correctly measuring the chromatic dispersion of an optical fiber having a specific dispersion characteristic such as an optical fiber diffraction grating, a dispersion shifted fiber (hereinafter, referred to as "DSF") or a dispersion flattened fiber (hereinafter, referred to as "DFF").

Particularly, it is important to measure a chromatic dispersion in a long-distance single mode optical fiber which mainly acts as a transmission line for the control of the chromatic dispersion. Recently, there is a need for an accurate measurement of a chromatic dispersion characteristic for respective very short length of optical fiber device along with a development of an optical fiber device such as an optical fiber diffraction grating.

FIG. 1 is a schematic block diagram illustrating the construction of a system for measuring a chromatic dispersion in an optical fiber using a conventional optical fiber Raman laser.

Referring to FIG. 1, there is shown the chromatic dispersion measuring system which includes an optical fiber Raman laser 10, a monochrometer 12, a test optical fiber 14, a photodetector 16, an oscilloscope 18, and an Nd:YAG pump laser 20.

The Nd:YAG pump laser 20 further includes an M–L RF driver, a Q–S RF driver, and a digital delay generator.

This measurement technique is using the time-of-flight method.

First, an optical pulse is generated and the generated optical pulse passes through a test optical fiber 14. The time delay difference between pulses having different wavelengths due to the chromatic dispersion in the test optical fiber is measured by a sampling oscilloscope 18 and a high speed photodetector 16.

A silica optical fiber Raman laser 10 pumped with a mode locked and Q switched Nd:YAG pump laser ($\lambda=1.06\ \mu$m) 20 is used, it is possible to measure a relatively large wavelength band of 1.1~1.2 $\mu$m, but the necessity for the monochrometer 12 makes miniaturization of the chromatic dispersion measuring system difficult.

FIG. 2 is a schematic block diagram illustrating the construction of a system for measuring a chromatic dispersion in an optical fiber using a conventional semiconductor laser diode array.

A construction and work of the chromatic dispersion system shown in FIG. 2 will be described hereinafter briefly.

Referring to FIG. 2, there is shown the chromatic dispersion measuring system which includes an electric pulse source, an InGaAsP semiconductor laser array 30, a wavelength division multiplexer 32, a test optical fiber 34, a high speed photodetector 36 and an oscilloscope 38.

The InGaAsP semiconductor laser array 30 is composed of six InGaAsP semiconductor lasers, which is driven with an electric pulse of 100 ps.

Like this, the use of the InGaAsP semiconductor laser array 30 enables miniaturization of the chromatic dispersion measuring system, but the necessity for the wavelength division multiplexer 32 results in an increase in a cost required for fabricating the chromatic dispersion measuring system.

Also, all the InGaAsP semiconductor lasers must be replaced according to a variation in a wavelength of a interest domain, which causes a difficulty in selecting a wavelength flexibly.

FIG. 3 is a schematic block diagram illustrating the construction of a system for measuring a chromatic dispersion in an optical fiber using a conventional phase shift measurement method.

A construction and work of the chromatic dispersion system shown in FIG. 3 will be described hereinafter briefly.

Referring to FIG. 3, there is shown the chromatic dispersion measuring system which includes a light source 40, a monochrometer 42, a photodetector 44, an amplifier, a vector electrometer 46, a curve fitting section 48, and a signal generator 50.

The phase shift measurement method according to FIG. 3 is a method in which an optical signal modulated with a sinusoidal wave instead of an optical pulse passes through a test optical fiber 34 in which a chromatic dispersion is measured, and then a phase shift for a wavelength caused due to the chromatic dispersion in the optical fiber is measured.

That is, when an optical signal modulated with a frequency f passes through the test optical fiber 34 in which a chromatic dispersion is measured and a phase shift before and after a passage of the optical signal through the test optical fiber 34 is measured according to a wavelength, the phase shift can be written as follows according to a group delay $\tau\ g(\lambda)$ per mode.

$$\Phi(\lambda)=2\pi f\tau g(\lambda)$$

Thus, such a phase shift according to a wavelength is measured and the measured phase shift undergoes a curve fitting process in the curve fitting section 48 so that the chromatic dispersion is estimated.

Accordingly, such a method has a disadvantage in that a phase shift according to a wavelength is measured, and then undergoes the curve fitting process again. Further, instead of a semiconductor laser an LED may be used as a light source 40, which makes it possible to fabricate the chromatic dispersion measuring system at a low cost, but the necessity for the monochrometer 42 makes miniaturization of the chromatic dispersion measuring system difficult.

In addition, in case of the chromatic dispersion measuring system, it is difficult to separate the light source 40 modulated by the signal generator 50 and the vector electrometer 46 for detecting the optical signal which has passes through the test optical fiber 34 from each other, which causes a problem in a remote control of the chromatic dispersion measuring system.

FIG. 4 is a schematic block diagram illustrating the construction of a system for measuring a chromatic dispersion in an optical fiber using a conventional interferometer.

Referring to FIG. 4, there is shown the chromatic dispersion measuring system which includes a white light source 60, a monochrometer 62, a reference optical fiber 64, a test optical fiber 66, and photodetector 68.

In an interferometric measurement method using the interferometer shown in FIG. 4, a Mach-Zehnder interferometer is used as a basic interferometer, and an input light is divided into two optical signals of an identical optical path. One of the two optical beams passes through the reference optical fiber 64 as a reference, and the other passes through the test optical fiber 66.

The two beams (optical pulses) are synthesized. The chromatic dispersion characteristic in the optical fiber to be measured from an interference fringe of the synthesized beam.

In such a method, a very short optical fiber within 1 m is advantageous, but in many cases the white light source 60 is used and the necessity for the monochrometer 62 makes miniaturization of the chromatic dispersion measuring system difficult.

Moreover, there is also needed a data processing process for again calculating a chromatic dispersion from a group delay caused by the chromatic dispersion in the test optical fiber obtained from the interference fringe, and a beam alignment and a chromatic dispersion measurement for a long-distance optical fiber is difficult.

Further, since the optical path of the two beams must be identical, an environment condition for the two beams must also be identical. For this reason, it is difficult to use such a chromatic dispersion measuring system for the long-length of optical fibers in a practical field.

As described above, according to such conventional prior arts (FIGS. 1 to 4) for the chromatic dispersion measurement, an optical pulse is generated and the generated optical pulse passes through an optical fiber in which a chromatic dispersion is measured. After that, a chromatic dispersion characteristic in the optical fiber to be measured can be found out indirectly using both a difference in a time domain or a frequency domain according to each wavelength and an interferometer.

Further, such a chromatic dispersion measurement requires a low-priced and miniaturized chromatic dispersion measurement system to enable the application of the system in a practical field since the chromatic dispersion measurement system is applicable to an optical fiber installed in a practical optical communication system. There is also needed a development of a chromatic dispersion measurement system for an application in a practical system insensitive to an external environment.

SUMMARY OF THE INVENTION

Therefore, the present invention has been made in view of the above-mentioned problems, and it is an object of the present invention to provide a system and method for measuring a chromatic dispersion in an optical fiber which enables an implementation of a system for an accurate measurement of a chromatic dispersion in both a long-distance optical fiber acting as a transmission line and a short-distance optical fiber such as an optical fiber element.

According to one aspect of the present invention, there is provided a system for measuring a chromatic dispersion in an optical fiber, comprising:

a multimode laser diode adapted to generate an optical pulse through a gain switching;

a highly dispersive optical fiber adapted to allow the gain switched optical output pulse to pass therethrough, and then adapted to separate each mode of the multimode laser diode to generate the multiwavelength optical pulse train as a reference signal;

a test optical fiber adapted to allow the multiwavelength optical pulse train by the highly dispersive optical fiber to pass therethrough to vary a spacing of the optical pulse due to a chromatic dispersion characteristic of the test optical fiber;

a high speed photodetector adapted to detect the variation of the repetition rate of the multiwavelength optical pulse train due to the chromatic dispersion characteristic of the test optical fiber; and an RF spectrum analyzer adapted to measure the repetition rate of the multiwavelength optical pulse train in frequency domain);

According to another aspect of the present invention, there is also provided a method for measuring a chromatic dispersion in an optical fiber, comprising the steps of:

(a) generating a pulse train through a gain switching of a multimode laser diode;

(b) generating a reference signal through the use of a mode separation by a highly dispersive optical fiber to generate a multi-wavelength pulse train;

(c) allowing the multi-wavelength pulse train generated by the highly dispersive optical fiber to pass through a test optical fiber; and (d) measuring a time delay difference between pulses having different wavelengths due to the chromatic dispersion in the optical fiber in a frequency domain.

According to the present invention, there is a proposed method for measuring a chromatic dispersion in an optical fiber in which the use of the generation of an optical pulse through a gain switching of a multimode Fabry Perot-laser diode (hereinafter, referred to as "FP-LD") and the mode separation by a highly dispersive optical fiber generates an multiwavelength optical pulse train as a reference signal.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiment of the present invention.

Figure 5:
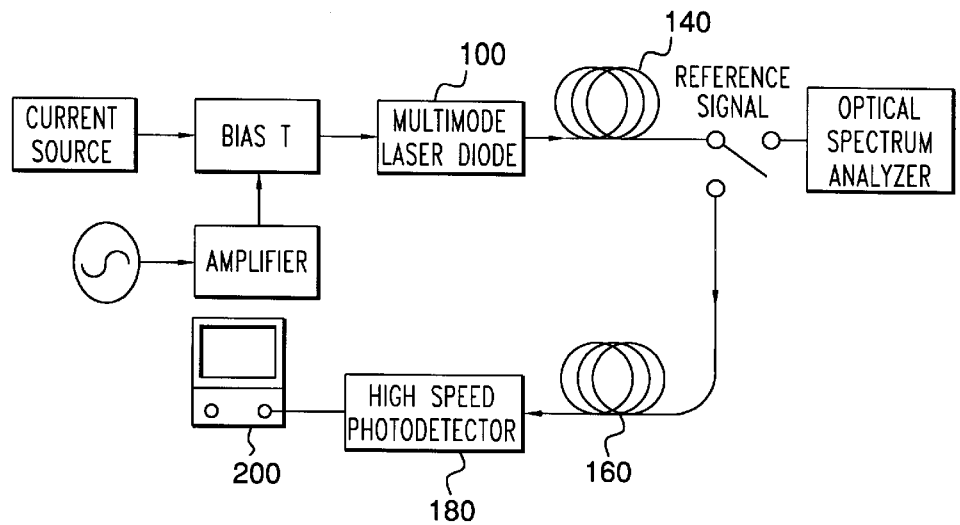
FIG. 5 is a schematic block diagram illustrating the construction of a system for measuring a chromatic dispersion in an optical fiber according to a preferred embodiment of the present invention.

FIG. 5 is a schematic block diagram illustrating the construction of a system for measuring a chromatic dispersion in an optical fiber according to a preferred embodiment of the present invention.

Referring to FIG. 5, there is shown the chromatic dispersion measuring system which includes a current source, a bias T, a multimode laser diode 100, a highly dispersive optical fiber 140, a test optical fiber 160, a high speed photodetector 180, an RF spectrum analyzer 200.

In FIG. 5, a conventional time-of-flight method is used in such a fashion that a multimode FP-LD is substituted for the Nd:YAG pump laser, the optical fiber Raman laser, the monochrometer, the semiconductor laser array and the wavelength division multiplexer as a light source to enable an implementation of a low-priced and miniaturized chromatic dispersion measurement system.

The semiconductor laser generates a light source having a wavelength of 0.7~1.6 $\mu$m depending on the selection of a gain medium, and the multimode laser diode 100 can adjust a resonant length of the laser to adjust a mode spacing between modes. Thus, the multimode laser diode 100 can be a light source which is able to obtain almost all ranges of the above wavelength.

At this time, when the multimode laser diode 100 is gain-switched, an optical pulse of 20~30 ps is obtained.

The gain switching is to properly adjust an injection current to excite only the first spike of a relaxation oscillation occurred initially when the semiconductor laser is driven.

As shown in FIG. 5, if a signal generated from a signal generator is applied to an amplifier which in turn amplifies the signal, and the current source injects a bias at a level just below a threshold current into the multimode laser diode 100 along with the amplified signal, the width of a pulse varies with a bias level and an amplitude of the amplified sinusoidal wave.

Accordingly, a proper adjustment of the bias level and the amplitude of the amplified sinusoidal wave establishes an optimum condition of the bias level and the amplitude of the amplified sinusoidal wave for obtaining a minimum pulse width.

At this time, the optical output pulse passes through the high dispersion→highly dispersive optical fiber 140 so that a reference signal is generated by a separation of each mode of the multimode laser diode 100. Preferably, the highly dispersive optical fiber 140 used herein is one having a large negative dispersion value in a wavelength range.

The gain-switched semiconductor laser has a red shift frequency chirping. Thus, the separation of each mode and the pulse compression with time can be obtained after the proper length of the highly dispersive fiber for compensating the frequency chirping.

If an highly dispersive fiber having a large positive dispersion value is used, both the separation of each mode and a broadening of the pulse also occur. As a result, the separation of each mode may not appear clearly.

For example, in case of measuring a chromatic dispersion for a wavelength of 1.55 $\mu$m, a dispersion compensating fiber (DCF) is used as the highly dispersive optical fiber 140.

In addition, the highly dispersive optical fiber 140 acts to generate a reference signal, and an adjustment of the length of the highly dispersive optical fiber 140 enables a chromatic dispersion measurement in a frequency domain having a maximum resolution which the RF spectrum analyzer 200 has. Accordingly, the length of the highly dispersive optical fiber is selected according to a characteristic for each wavelength range. Here, since the chromatic dispersion measurement is intended to observe a variation in repetition rate of the multiwavelength optical pulse train but not to directly measure the compression or broadening of the pulse, the compression or broadening of the pulse may not be taken into consideration as long as a repetition rate between the pulses, i.e., the mode spacing is great sufficiently.

When a multiwavelength pulse train for each wavelength separated sufficiently by the highly dispersive optical fiber 140 is used as the reference signal, and the pulse train passes through the test optical fiber 160 in which a chromatic dispersion is measured, there occurs a variation in a spacing of the pulse train due to a chromatic dispersion characteristic of the test optical fiber 160. Then, the high speed photodetector 180 detects the variation in the spacing of the pulse train to apply the detected variation of the pulse train to the RF spectrum analyzer 200 which, in turn, measures a chromatic dispersion of the detected pulse train.

Figure 6:
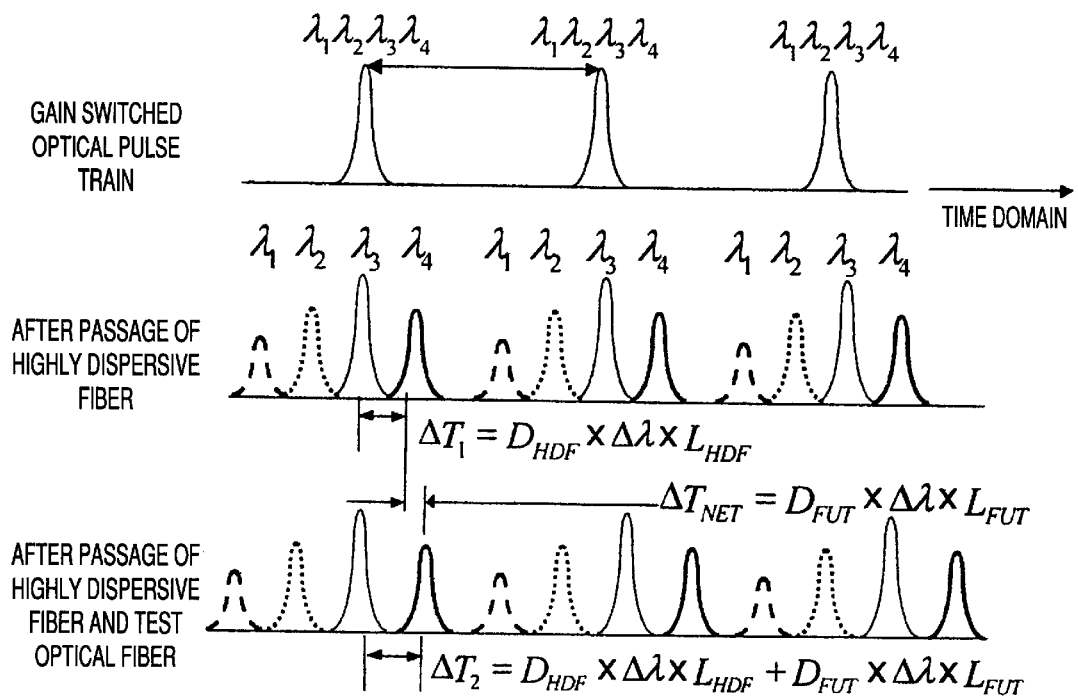
FIG. 6 is a diagrammatic view illustrating a multiwavelength pulse train generating process in a time domain for the chromatic dispersion measurement according to the present invention.

FIG. 6 is a diagrammatic view illustrating a multiwavelength optical pulse train generating process in a time domain for the chromatic dispersion measurement according to the present invention.

Referring to FIG. 6, $D_{HDF}$ denotes a chromatic dispersion in the highly dispersive optical fiber 140, $L_{HDF}$ denotes the length of the highly dispersive optical fiber 140, $D_{FUT}$ denotes a chromatic dispersion in the fiber under test 160, $L_{FUT}$ denotes the length of the test optical fiber 160, and $\Delta\lambda$ denotes a mode spacing.

If the chromatic dispersion is measured by a sampling oscilloscope instead of the spectrum analyzer, when the chromatic dispersion in the test optical fiber is small, i.e., when the length of the optical fiber to be tested is very short or the optical fiber is a dispersion shifted fiber (DSF) in which a chromatic dispersion is nearly 0, the variation in the mode spacing is too small to measure.

On the contrary, the variation in the mode spacing is greater in a frequency domain where the RF spectrum analyzer is used than in the time domain.

A frequency shift for the reference signal measured by the spectrum analyzer after a passage of the test optical fiber can be written as follows.

$$\Delta f = \frac{1}{D_{HDF} \times L_{HDF} \times \Delta\lambda + D_{FUT} \times L_{FUT} \times \Delta\lambda} - \frac{1}{D_{HDF} \times L_{HDF} \times \Delta\lambda} \quad \text{[Expression 1]}$$

Here, $D_{HDF}$ denotes a chromatic dispersion in the highly dispersive optical fiber 140, $L_{HDF}$ denotes the length of the highly dispersive optical fiber 140, $D_{FUT}$ denotes a chromatic dispersion in the test optical fiber 160, $L_{FUT}$ denotes the length of the test optical fiber 160, and $\Delta\lambda$ denotes a mode spacing of the FP-LD.

Figure 7:
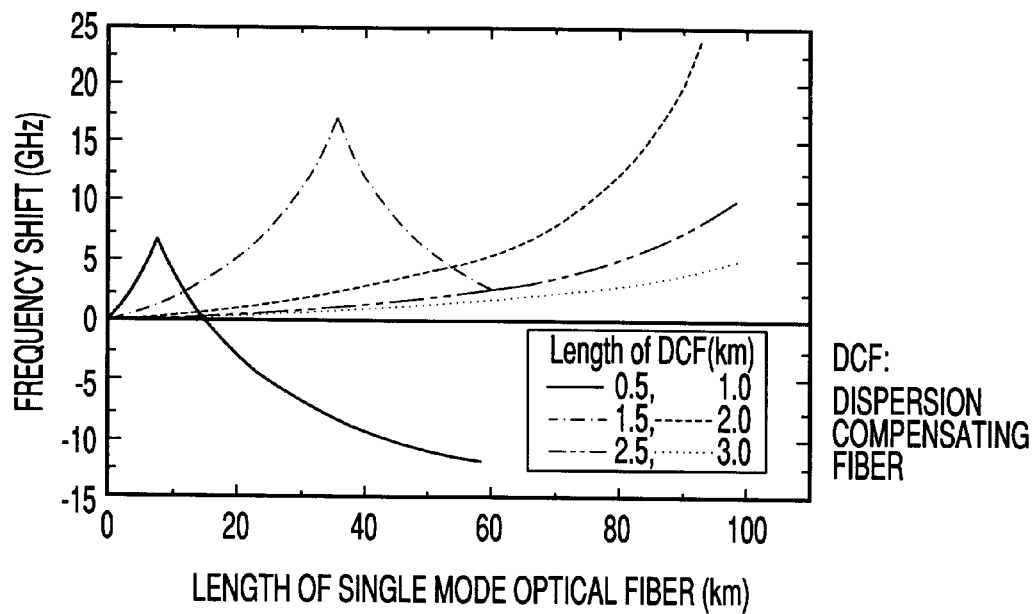
FIG. 7 is a graph illustrating a relationship between a length of a single mode fiber as a test optical fiber and a frequency shift on a spectrum analyzer according to a variation in the length of DCF (dispersion compensating fiber) as a highly dispersive fiber according to the present invention.

FIG. 7 is a graph illustrating a relationship between a length of a test optical fiber and a frequency shift on a spectrum analyzer according to a variation in the length of DCF (dispersion compensating fiber) according to the present invention.

Referring to FIG. 7, a wavelength of 1.55 μm is set as a reference. In case of using a dispersion compensating optical fiber (DCF) having a chromatic dispersion of −95 ps/nm/km at the wavelength of 1.55 μm as the highly dispersive optical fiber 140 when a chromatic dispersion in a single mode optical fiber is measured as 17 ps/nm/km, there occurs a frequency shift on the spectrum analyzer for the length of the single mode optical fiber used as the test optical fiber 160 according to a variation in the length of DCF (dispersion compensating fiber) used as the highly dispersive optical fiber for generating a reference signal.

As shown in FIG. 7, even in case of the test optical fiber 160 having an identical length, a proper adjustment of the length of the high dispersion optical fiber 140 for generating the reference signal makes it possible to measure the frequency shift on the spectrum analyzer more easily.

Figure 8:
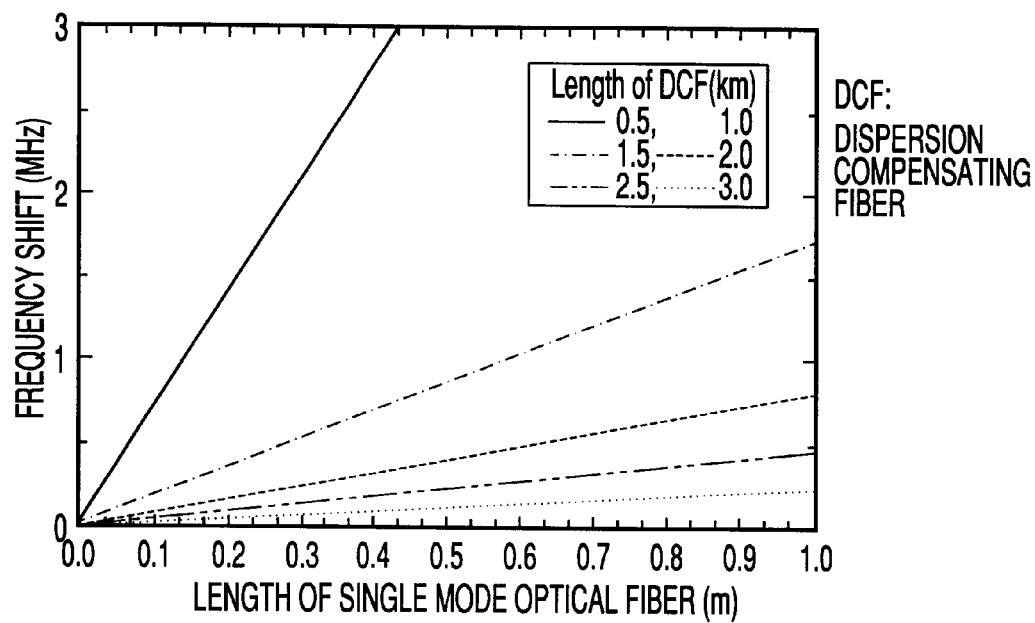
FIG. 8 is a graph illustrating a relationship between a length of a single mode fiber as a test optical fiber and a frequency shift on a spectrum analyzer according to a variation in the length of DCF (dispersion compensating fiber) as a highly dispersive fiber in the case where the length range of the single mode fiber is within 1 m according to the present invention.

FIG. 8 is a graph illustrating a relationship between a length of the test optical fiber and a frequency shift on the spectrum analyzer according to a variation in the length of DCF (dispersion compensating fiber) in the case where the length range of the test optical fiber 160 is within 1 m according to the present invention.

Referring to FIG. 8, there is shown a frequency shift on the spectrum analyzer according to the case where the length of the test optical fiber 160 is within 1 m. In this case, it can be seen from the graph of FIG. 8 that an adjustment of the length of the highly dispersive optical fiber 140 makes it possible to measure the frequency shift in a frequency domain coincident with a maximum resolution bandwidth of the spectrum analyzer.

Accordingly, even in case of a long-distance optical fiber or a short-distance optical fiber having a length less than 1 m, a proper adjustment of the length of the highly dispersive optical fiber 140 makes it possible to measure the frequency shift on the spectrum analyzer, and then a chromatic dispersion in the optical fiber.

As can be seen from the foregoing, the system and method for measuring a chromatic dispersion in an optical fiber have the following advantages:

First, since a semiconductor laser is used as a light source, it is possible to measure the chromatic dispersion in the optical fiber at a wide wavelength range of 0.7~1.6 μm.

Second, since a pulse generated by gain-switching a multimode FP-LD is used a light source, it is possible to implement a low-priced and miniaturized chromatic dispersion measurement system.

Third, the pulse generated from the gain-switched a multimode FP-LD passes through the dispersion compensating optical fiber used as the high dispersion optical fiber 140, and then a pulse train in which a mode separation is performed is used as a reference signal. Thus, a proper adjustment of the length of the dispersion compensating optical fiber (more generally, an optical fiber for generating the reference signal) makes it possible to reduce a frequency to the frequency range required for a measurement of the chromatic dispersion in the optical fiber, which enables a low-priced frequency analyzer allowing a measurement of the chromatic dispersion in a relatively low frequency range to measure the chromatic dispersion. Such a mode separation is caused by only a chromatic dispersion characteristic of the high dispersion optical fiber, thereby improving a jitter characteristic.

Fourth, a time-of-flight method is used, and a measurement of this time delay difference can be performed by the RF spectrum analyzer in a frequency domain, which enables a measurement of the chromatic dispersion in a long-distance optical fiber or a short-distance optical fiber having a length less than 1 m.

Figure 1:
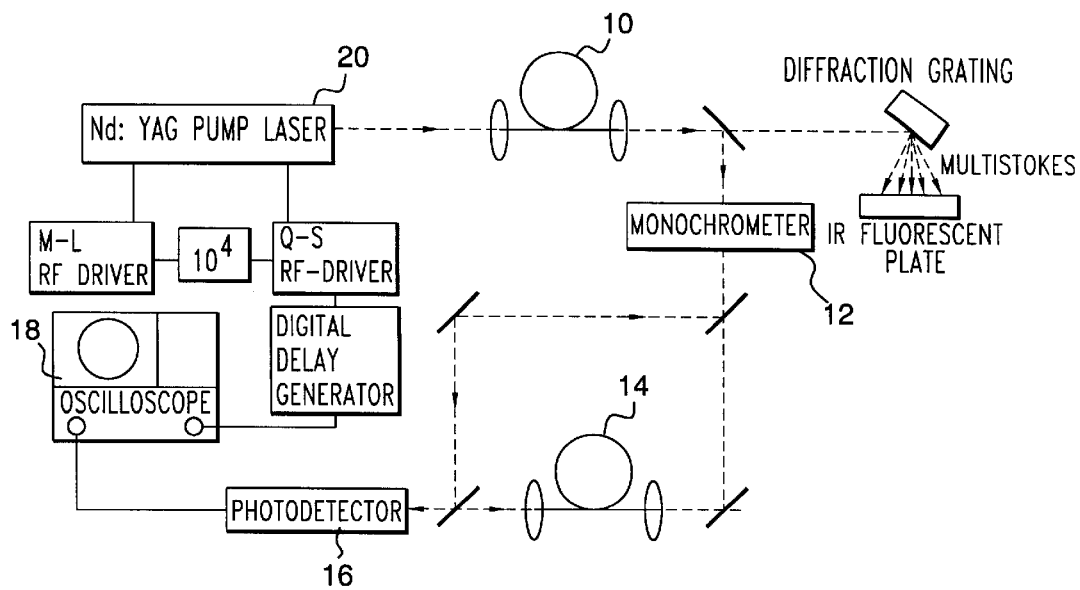
FIG. 1 is a schematic block diagram illustrating the construction of a system for measuring a chromatic dispersion in an optical fiber using a conventional optical fiber Raman laser.
Figure 2:
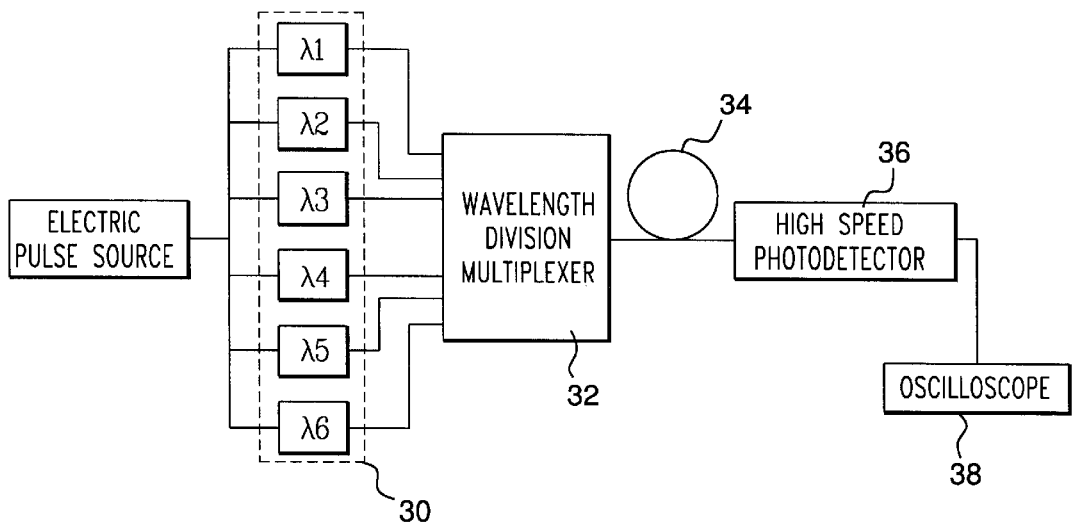
FIG. 2 is a schematic block diagram illustrating the construction of a system for measuring a chromatic dispersion in an optical fiber using a conventional semiconductor laser array.
Figure 3:
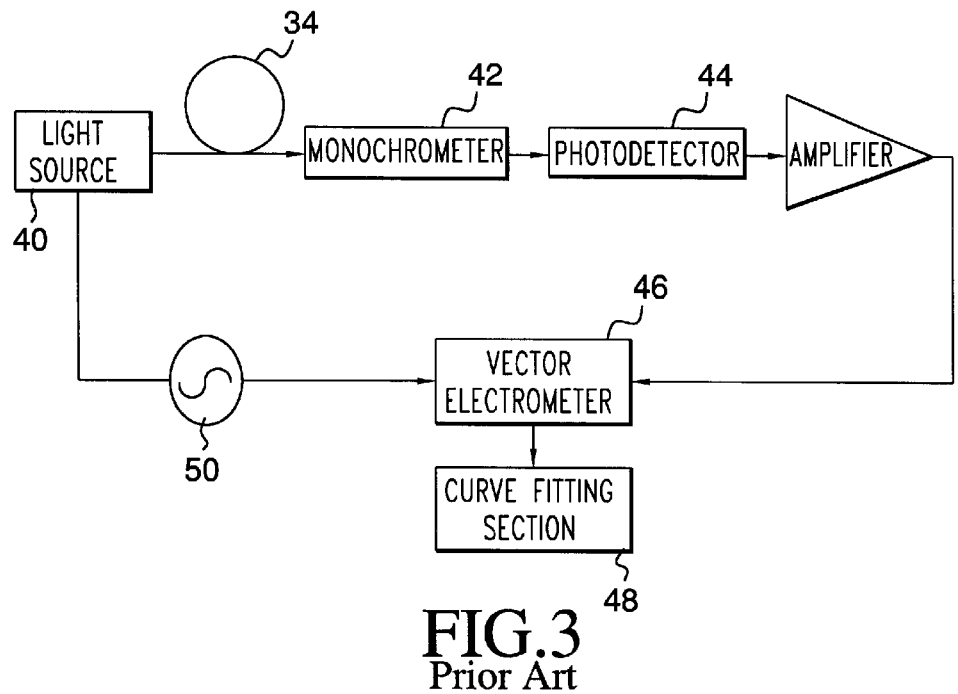
FIG. 3 is a schematic block diagram illustrating the construction of a system for measuring a chromatic dispersion in an optical fiber using a conventional phase shift measurement method.
Figure 4:
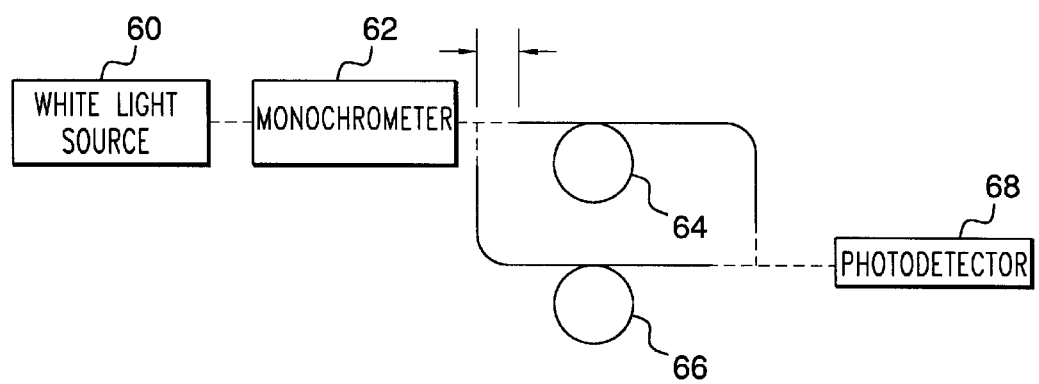
FIG. 4 is a schematic block diagram illustrating the construction of a system for measuring a chromatic dispersion in an optical fiber using a conventional interferometer.

Fifth, since the reference optical fiber and the test optical fiber are not separated from each other like in the chromatic dispersion measurement method using a conventional interferometer of FIG. 4, the present invention is insensitive to an external environmental change such as a temperature of the optical fiber end and the like, which enables its application to a practical system.

While this invention has been described in connection with what is presently considered to be the most practical and preferred embodiment, it is to be understood by those skilled in the art that the invention is not limited to the disclosed embodiment, but, on the contrary, it is intended to cover various modifications within the spirit and scope of the appended claims.

What is claimed is:

1. A system for measuring a chromatic dispersion in an optical fiber, comprising:
    a multimode Fabry-Perot laser diode adapted to generate optical pulses by gain switching;
    a highly dispersive optical fiber adapted to allow the optical pulses to pass therethrough and to separate respective optical pulses corresponding to each mode of the multimode laser diode to generate a time domain reference signal made up of a pulse train that includes a plurality of optical pulses separated by wavelength;
    a test optical fiber adapted to allow each of said optical pulses in said reference signal to pass therethrough and to vary a spacing of the optical pulses in the reference signal due to a chromatic dispersion characteristic of the test optical fiber;
    a high speed photodetector adapted to detect a variation in spacing of the optical pulses in said reference signal relative to the respective spacing of the optical pulses passing through said test optical fiber, and to generate electrical signals corresponding to said variation; and
    an RF spectrum analyzer adapted to measure frequencies of the electrical signals and thereby measure a chromatic dispersion characteristic of the test optical fiber,
    wherein an optical path of the reference signal is in line with and not separated from an optical path through the test optical fiber.

2. The system according to claim 1, wherein a wavelength range for enabling the chromatic dispersion measurement in the optical fiber is 0.7~1.6 μm.

3. A method for measuring a chromatic dispersion in an optical fiber, comprising the steps of:

(a) generating a pulse train through gain switching of a multimode laser diode;

(b) generating a reference signal by using a highly dispersive optical fiber to generate a multi-wavelength optical pulse train including a plurality of pulses of different wavelengths;

(c) allowing the multi-wavelength optical pulse train of different wavelengths to pass through a test optical fiber; and (d) measuring a time delay difference between pulses in the reference signal from the highly dispersive optical fiber and the respective pulses in the signal from the test fiber, and using the time delay difference to determine chromatic dispersion in the test optical fiber, wherein an optical path of the reference signal is in line with and not separated from an optical path through the test optical fiber.

4. The method according to claim 3, wherein in the step (b), the reference signal is adjusted according to the length of the highly dispersive optical fiber so that a length range of the test optical fiber in which the chromatic dispersion is measured is expanded.

* * * * *